(12) United States Patent
Takezawa et al.

(10) Patent No.: US 12,087,089 B2
(45) Date of Patent: Sep. 10, 2024

(54) VEHICLE, INFORMATION PROCESSING APPARATUS, AND METHOD

(71) Applicant: TOYOTA JIDOSHA KABUSHIKI KAISHA, Toyota (JP)

(72) Inventors: Yoshiyasu Takezawa, Okazaki (JP); Hirotaka Todaka, Toyota (JP); Takao Kiguchi, Nagoya (JP); Chieko Sawada, Nagoya (JP); Yosuke Tokuda, Toyota (JP); Ayaka Kagami, Inazawa (JP); Natsuki Sugiyama, Nisshin (JP); Takuzo Hirano, Nagoya (JP); Taichi Amakasu, Toyota (JP); Seiei Hibino, Nagakute (JP); Hiroshi Kawakami, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 715 days.

(21) Appl. No.: 17/322,192

(22) Filed: May 17, 2021

(65) Prior Publication Data

US 2021/0354534 A1 Nov. 18, 2021

(30) Foreign Application Priority Data

May 18, 2020 (JP) .................................. 2020-086680

(51) Int. Cl.
*G06V 10/60* (2022.01)
*B60J 1/17* (2006.01)
(Continued)

(52) U.S. Cl.
CPC .............. *G06V 40/174* (2022.01); *B60J 1/17* (2013.01); *B60J 3/04* (2013.01); *G06V 10/60* (2022.01); *G06V 20/59* (2022.01); *G06V 40/20* (2022.01)

(58) Field of Classification Search
CPC ...... G06V 40/174; G06V 10/60; G06V 20/59; G06V 40/20; B60J 3/04
See application file for complete search history.

(56) References Cited

U.S. PATENT DOCUMENTS

2017/0242315 A1* 8/2017 Ash ............................ B60J 3/04
2019/0346701 A1* 11/2019 Lam ...................... G06V 20/597
(Continued)

FOREIGN PATENT DOCUMENTS

JP S62-255220 A 11/1987
JP H10-329541 A 12/1998
(Continued)

*Primary Examiner* — Rodney A Butler
(74) *Attorney, Agent, or Firm* — Oliff PLC

(57) ABSTRACT

There is provided a vehicle including: a plurality of dimming glass units used for a plurality of windows; a sensor that acquires an entering situation of natural light at a predetermined position; and a controller. The controller performs: specifying a first dimming glass unit that is a control target out of the plurality of dimming glass units in accordance with the entering situation of natural light; and controlling a light shielding property of the first dimming glass unit. The controller controls the first dimming glass unit so as to be into a light shielding state when the entering situation of natural light satisfies a first condition indicating that an occupant in the vehicle feels glaringness, and releases the light shielding state of the first dimming glass unit when the entering situation of natural light satisfies a second condition indicating that the occupant in the vehicle does not feel glaringness.

16 Claims, 5 Drawing Sheets

(51) Int. Cl.
  *B60J 3/04*    (2006.01)
  *G06V 20/59*   (2022.01)
  *G06V 40/16*   (2022.01)
  *G06V 40/20*   (2022.01)

(56) References Cited

U.S. PATENT DOCUMENTS

2020/0301144 A1\* 9/2020 Yamasaki ............... G06F 3/012
2023/0152616 A1\* 5/2023 Wang .................. G02F 1/13338
                                                    359/245

FOREIGN PATENT DOCUMENTS

| JP | 2005-333226 A | 12/2005 |
| JP | 2007-076396 A | 3/2007 |
| JP | 2007-091081 A | 4/2007 |
| JP | 2008-195262 A | 8/2008 |

\* cited by examiner

FIG. 4

GLASS INFORMATION TABLE

| GLASS ID | POSITION | SENSOR ID | LIGHT SHIELDING STATE |
|---|---|---|---|
| G001 | | S001 | OFF |
| G002 | | S002 | ON |

⋮

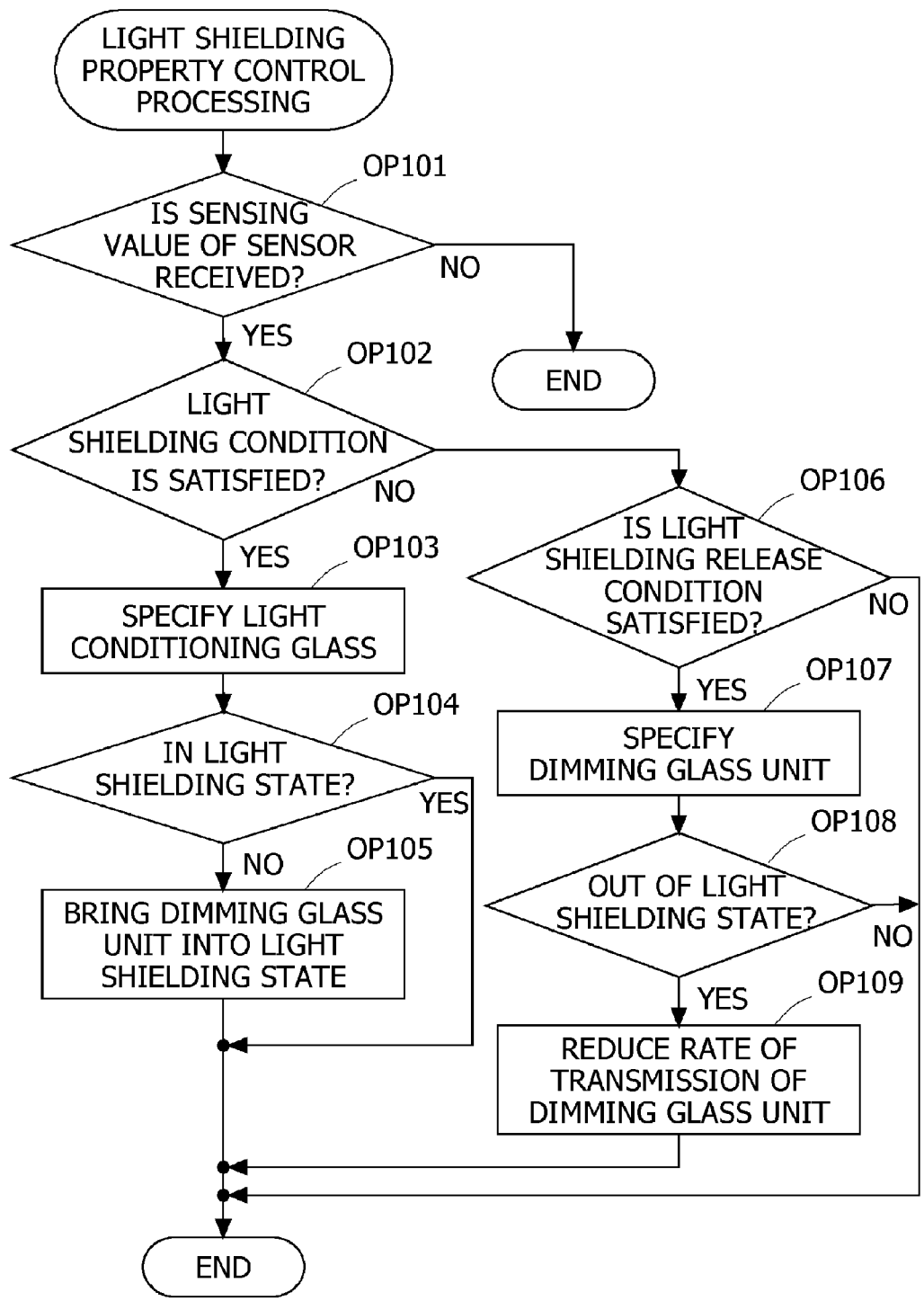

VEHICLE, INFORMATION PROCESSING APPARATUS, AND METHOD

CROSS REFERENCE TO THE RELATED APPLICATION

This application claims the benefit of Japanese Patent Application No. 2020-086680, filed on May 18, 2020, which is hereby incorporated by reference herein in its entirety.

BACKGROUND

Technical Field

The present disclosure relates to a vehicle, an information processing apparatus, and a method.

Description of the Related Art

There are disclosed technologies of making a television conference between vehicles using television cameras, microphones, communication terminals, and display devices for car navigation apparatuses mounted on the vehicles (for example, Patent document 1).

CITATION LIST

Patent Document

[Patent document 1] Japanese Patent Laid-Open No. 2005-333226

Since a vehicle travels outdoors, natural light enters the interior of the vehicle. The natural light entering the interior of the vehicle occasionally causes a problem, for example, of making it hard to see the display device used in the television conference and/or the similar problem.

A problem of one of aspects of the disclosure is to provide a vehicle, an information processing apparatus, and a method capable of relieving an occupant's hardness of seeing in a vehicle due to entering of natural light.

SUMMARY

One aspect of the present disclosure is a vehicle comprising:
a plurality of dimming glass units used for a plurality of windows;
a sensor configured to acquire an entering situation of natural light at a predetermined position; and
a controller configured to:
specify a first dimming glass unit that is a control target out of the plurality of dimming glass units in accordance with the entering situation of the natural light; and
control a light shielding property of the first dimming glass unit.

Another aspect of the present disclosure is an information processing apparatus mounted on a vehicle, comprising a controller configured to:
specify a first dimming glass unit that is a control target out of a plurality of dimming glass units used for a plurality of windows of the vehicle in accordance with an entering situation of natural light at a predetermined position in the vehicle, the entering situation acquired by a sensor; and
control a light shielding property of the first dimming glass unit.

Another aspect of the present disclosure is a method comprising: by a computer mounted on a vehicle, specifying a first dimming glass unit that is a control target out of a plurality of dimming glass units used for a plurality of windows of the vehicle in accordance with an entering situation of natural light at a predetermined position in the vehicle, the entering situation acquired by a sensor; and
controlling a light shielding property of the first dimming glass unit.

According to the present disclosure, an occupant's hardness of seeing in a vehicle due to entering of natural light can be relieved.

BRIEF DESCRIPTION OF THE DRAWINGS

FIG. 4 illustrates an example of the glass information table; and

FIG. 5 is an example of a flowchart of processing for controlling the light shielding properties of the dimming glass units in the control apparatus.

DESCRIPTION OF THE EMBODIMENTS

Figure 1:
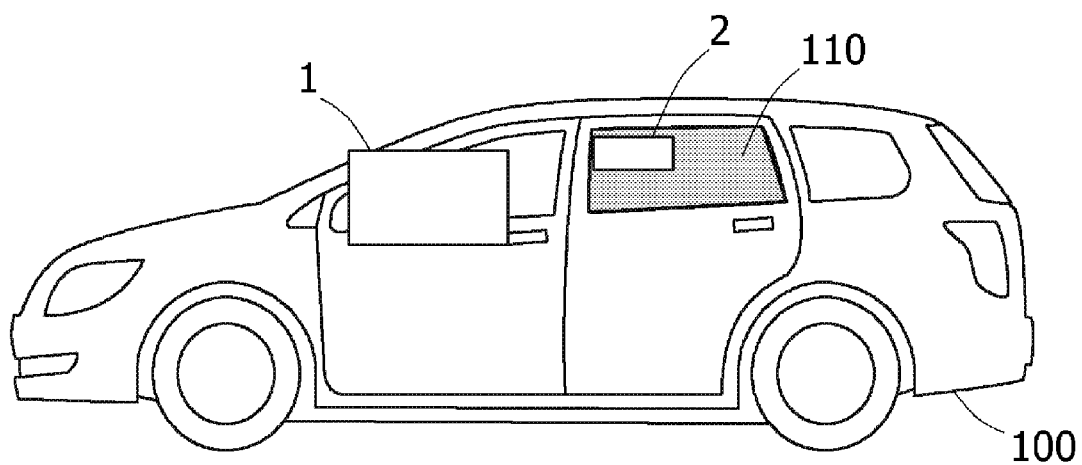
FIG. 1 is a diagram illustrating an example of a vehicle according to a first embodiment.

One of aspects of the present disclosure is a vehicle having a plurality of dimming glass units used for a plurality of windows. The vehicle may include a sensor that acquires an entering situation of natural light at a predetermined position. Moreover, the vehicle may include a controller configured to: specify a first dimming glass unit that is a control target out of the plurality of dimming glass units in accordance with the entering situation of natural light; and control a light shielding property of the first dimming glass unit.

Each dimming glass unit is glass adjustable in quantity of transmitted light, for example, with an external signal such as electricity. For example, the dimming glass unit is controllable in rate of transmission by applying a voltage, which can change a concentration (transparency), a color tone and/or the like into a light shielding state. Thereby, a light shielding property of the dimming glass unit can be controlled. The dimming glass units are used, for example, for at least two or more of both lateral, front and rear windows of a vehicle.

According to one of aspects of the present disclosure, since the light shielding property of a dimming glass unit used for a window of a vehicle is controlled in accordance with the entering situation of natural light, an occupant's hardness of seeing in the vehicle due to entering of the natural light can be relieved.

The sensor acquiring the entering situation of natural light is exemplarily an illuminometer or a camera. The sensor acquiring the entering situation of natural light is noted not to be limited to these. Moreover, the controller may control the first dimming glass unit so as to be into the light shielding state when the entering situation of the natural light satisfies a first condition indicating that an occupant in the vehicle feels glaringness. Thereby, when the natural light is glaring, the first dimming glass unit is brought into the light shielding state and can block off the natural light.

Moreover, the controller may be configured to perform control to release the light shielding state of the first dimming glass unit when the entering situation of the natural light satisfies a second condition indicating that the occupant in the vehicle does not feel glaringness. Thereby, when the situation changes, so that the natural light is somewhat not glaring, the first dimming glass unit in the light shielding state can be returned to be in the normal state by releasing the light shielding state.

In one of aspects of the present disclosure, the controller may control the light shielding property of the first dimming glass unit by controlling a rate of transmission of the dimming glass unit. For example, the light shielding property of a dimming glass unit increases more as the rate of transmission of the dimming glass unit increases more. For example, the light shielding property of a dimming glass unit decreases more as the rate of transmission of the dimming glass unit decreases more. It is noted that the relation between the rate of transmission of the dimming glass unit and the dimming glass unit is not limited to this.

In one of aspects of the present disclosure, the sensors may include a plurality of illuminometers provided in association with the plurality of respective dimming glass units. In this case, the controller may specify, when it is satisfied, as the first condition, that a sensing value of at least one of the plurality of illuminometers is larger than a first threshold, a dimming glass unit corresponding to the at least one illuminometer as the first dimming glass unit. Since the illuminometer and the dimming glass unit are associated with each other, the first dimming glass unit can be specified by specifying the illuminometer for which the sensing value is larger than the first threshold.

Moreover, when the sensors include the plurality of illuminometers provided in association with the plurality of respective dimming glass units, the controller may specify, when it is satisfied, as the second condition, that a sensing value of at least one of the plurality of illuminometers is smaller than a second threshold equal to or less than the first threshold, a dimming glass unit corresponding to the at least one illuminometer as the first dimming glass unit. Thereby, the light shielding state of the dimming glass unit is released in the case of no glaring.

Moreover, in one of aspects of the present disclosure, the sensor may be an image capturing apparatus that captures an image of an interior of the vehicle. In this case, the controller may specify, when it is satisfied, as the first condition, that a region having a luminance equal to or more than a predetermined value is detected from the captured image of the image capturing apparatus, a dimming glass unit that natural light enters from the captured image as the first dimming glass unit. Thereby, the entering situation of natural light in the vehicle can be acquired using the image capturing apparatus capturing an image of the interior of the vehicle to specify the first dimming glass unit. Since the image capturing apparatus is an apparatus which can be relatively easily mounted, it can be added into the vehicle afterward. Moreover, the controller may specify, when it is satisfied, as the first condition, that at least any of an expression or an action of an occupant feeling glaringness in the vehicle is detected from the captured image of the image capturing apparatus, a dimming glass unit that natural light enters from the image capturing apparatus as the first dimming glass unit. Thereby, when an occupant in the vehicle actually feels glaringness, the light shielding property of the dimming glass unit can be controlled and accuracy of the control can be improved.

Moreover, in one of aspects of the present disclosure, when the sensor is an image capturing apparatus that captures an image of an interior of the vehicle, the controller may specify, when it is satisfied, as the second condition, that a region having a luminance equal to or more than a predetermined value is not detected from the captured image of the image capturing apparatus, at least part of the plurality of dimming glass units as the first dimming glass unit(s). Moreover, the controller may specify, when it is further satisfied, as the second condition, that neither an expression nor an action of an occupant feeling glaringness in the vehicle is detected from the captured image of the image capturing apparatus, at least part of the plurality of dimming glass units as the first dimming glass unit(s). Thereby, the light shielding properties of the dimming glass units can be restrained from frequently changing, and when an occupant in the vehicle is in the state of not feeling glaringness, the light shielding properties of the dimming glass units can be accurately controlled.

Notably, another of aspects of the present disclosure may be specified as an information processing apparatus which performs the aforementioned processing of the controller of the vehicle.

In the following, an embodiment of the present disclosure will be described with reference to the drawings. The configuration of the embodiment described below is an example, and the present disclosure is not limited to the configuration of the embodiment.

First Embodiment

FIG. 1 is a diagram illustrating an example of a vehicle 100 according to a first embodiment. The vehicle 100 is a vehicle in which dimming glass units 110 are used for at least two windows and which controls light shielding properties of the dimming glass units in accordance with entering situations of natural light.

The dimming glass units are used, for example, for windows on both lateral faces and the rear face of the vehicle. It is noted that not limited to this, for example, a dimming glass unit do not have to be used for the window on the lateral face of the driver's seat. For example, a dimming glass unit may be used for the front.

A quantity of light transmitted through the dimming glass unit 110 is adjusted, for example, by a voltage being applied thereto. In the first embodiment, the dimming glass unit 110 is controlled, for example, in terms of a rate of transmission in accordance with the value of the applied voltage, which changes the concentration (transparency), the color tone and/or the like. By the voltage being applied, the dimming glass unit 110 becomes opaque or takes on a color high in light shielding property such as black into a light shielding state. The initial state of the dimming glass unit 110 is a state where a voltage is not applied, and the state where a voltage is not applied is supposed to be a transparent state. By application of a voltage to the dimming glass unit 110 being stopped, the dimming glass unit 110 is brought into the transparent state and the light shielding state is released.

In the first embodiment, as to the dimming glass unit 110, the rate of transmission is controlled and the transparency is supposed to be lower, that is, opaquer as the rate of transmission increases more. Notably, the dimming glass unit 110 by way of example may be able to get a video image from a projector projected as a screen in its opaque state or may be able to be used as a display which has a liquid crystal film to display a video image.

The vehicle 100 includes a control apparatus 1 and a sensor 2. The sensor 2 is a sensor which acquires the entering situation of natural light at a predetermined position in the vehicle 100. The sensor 2 is exemplarily an illuminometer provided on the surface of each dimming glass unit 110, or a camera which captures an image of the interior of the vehicle 100. The sensor 2 is noted not to be limited to these. When the sensor 2 is the illuminometer, an illuminance is detected as the entering situation of natural light. When the sensor 2 is the camera, a captured image in the vehicle 100 is acquired as the entering situation of natural light.

When information indicating the entering situation of natural light is input from the sensor 2, the control apparatus 1 specifies a dimming glass unit 110 which is a control target in accordance with the entering situation of natural light, and controls the light shielding property of the specified dimming glass unit 110. Examples of the dimming glass unit 110 as the control target include a dimming glass unit 110 in a window that natural light enters, and a dimming glass unit 110 that is in the light shielding state although natural light does not enter it. The light shielding state is a state of blocking off natural light or the similar state. More specifically, in the first embodiment, the light shielding state is a state where the dimming glass unit 110 is opaque by the rate of transmission being elevated.

In the first embodiment, the light shielding properties of the dimming glass units 110 used for the windows are controlled in accordance with the entering situation of natural light at a predetermined position in the vehicle 100. For example, when a dimming glass unit is used as a screen or a display, hardness of seeing occasionally arises due to entering of natural light or the similar situation. Moreover, when a desk is provided in the vehicle 100 and work is being carried out on the desk, entering of natural light occasionally makes a shade on the desk and fluttering of the shade disturbs smooth work. According to the first embodiment, the light shielding states of the dimming glass units 110 can relieve an occupant's hardness of seeing in the vehicle 100 as above.

Figure 2:
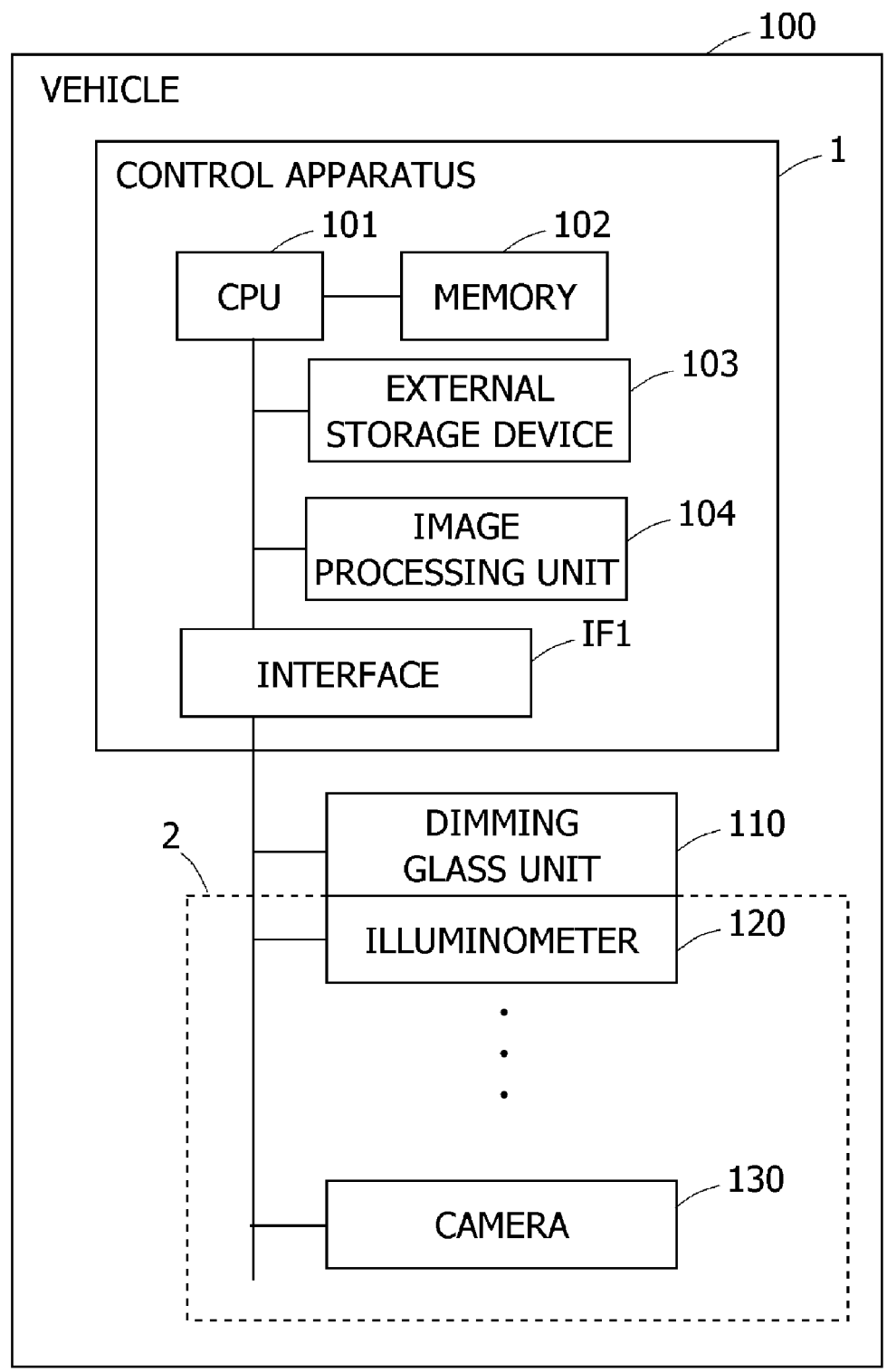
FIG. 2 is a diagram illustrating an example of a hardware configuration of the vehicle.

FIG. 2 is a diagram illustrating an example of a hardware configuration of the vehicle 100. FIG. 2 extracts and illustrates hardware components regarding control of the dimming glass units, and omits other hardware components. The vehicle 100 may be an electric automobile or may be an engine-driven automobile. Moreover, the vehicle 100 may be a vehicle which travels under driver's manipulation or may be a self-driving vehicle.

The vehicle 100 includes the control apparatus 1, the dimming glass units 110, illuminometers 120, and a camera 130. Although the dimming glass units 110 and the illuminometers 120 are provided in plural, FIG. 2 illustrates a single set of those solely. Each illuminometer 120 is one of the sensors 2. Light sensing units of the illuminometers 120 are installed on the surfaces of the dimming glass units 110. Notably, the light sensing units of the illuminometers 120 are photodiodes or the like. A plurality of light sensing units may correspond to one illuminometer 120 main body, so that the plurality of light sensing units are installed on the surface of each dimming glass unit 110, or one light sensing unit may correspond to one illuminometer 120 main body. Each illuminometer 120 outputs an illuminance to the control apparatus 1 at predetermined period.

The camera 130 is one of the sensors 2. The camera 130 is an image capturing apparatus composed of an image sensor such as Charged-Coupled Devices (CCD), Metal-Oxide-Semiconductor (MOS) or Complementary Metal-Oxide-Semiconductor (CMOS). The camera 130 acquires images to output them to the control apparatus 1 at predetermined time intervals called frame period. The camera 130 is installed so as to include the entire interior of the vehicle 100 within its image capturing range. Notably, a plurality of cameras 130 may be installed so as to have respective different image capturing directions.

The control apparatus 1 is also called Electronic Control Unit (ECU). The control apparatus 1 has a CPU 101, a memory 102, an external storage device 103, an image processing unit 104, and an interface IF1. The interface IF1 is connected to a CAN (Controller Area Network), and via the CAN, connected to the dimming glass units 110, the illuminometers 120, and the camera 130.

The CPU 101 executes a computer program executably expanded on the memory 102 and performs processing as the control apparatus 1. The memory 102 stores the computer program executed by the CPU 101, data processed by the CPU 101, and the like. Examples of the memory 102 include a Dynamic Random Access Memory (DRAM), a Static Random Access Memory (SRAM), and a Read Only Memory (ROM). The external storage device 103 is a nonvolatile storage device, and examples thereof include a Solid State Drive (SSD), and a hard disk drive. The image processing unit 104 cooperates with the CPU 101 to process the captured image obtained for every predetermined frame period from the camera 130. For example, the image processing unit 104 includes a GPU and an image memory which is a frame buffer.

Notably, the hardware configuration of the vehicle 100 is not limited to the configuration illustrated in FIG. 2. It can be properly modified according to a mode of its implementation. While FIG. 2 illustrates the set of illuminometers 120 and the camera 130 as the sensors 2, any one of those may be provided. The control apparatus 1 is an example of the "information processing apparatus". The CPU 101 is an example of the "controller".

While FIG. 2 exemplarily illustrates the interface IF1, transfer of signals between the control apparatus 1 and the control target does not limitedly depend on the interface IF1. Namely, the control apparatus 1 may have a plurality of signal transfer paths other than the interface IF1. Moreover, in FIG. 2, the control apparatus 1 has the single CPU 101. It is noted that not limited to a single processor, the CPU may have a multiprocessor configuration. Moreover, a single CPU connected through a single socket may have a multi-core configuration. At least part of processing of the aforementioned components may be performed by a processor other than the CPU, for example, an exclusive processor such as a Digital Signal Processor (DSP) and a Graphics Processing Unit (GPU). Moreover, at least part of processing of the aforementioned components may be an integrated circuit (IC) or another digital circuit. Moreover, at least part of the aforementioned components may include an analog circuit.

Figure 3:
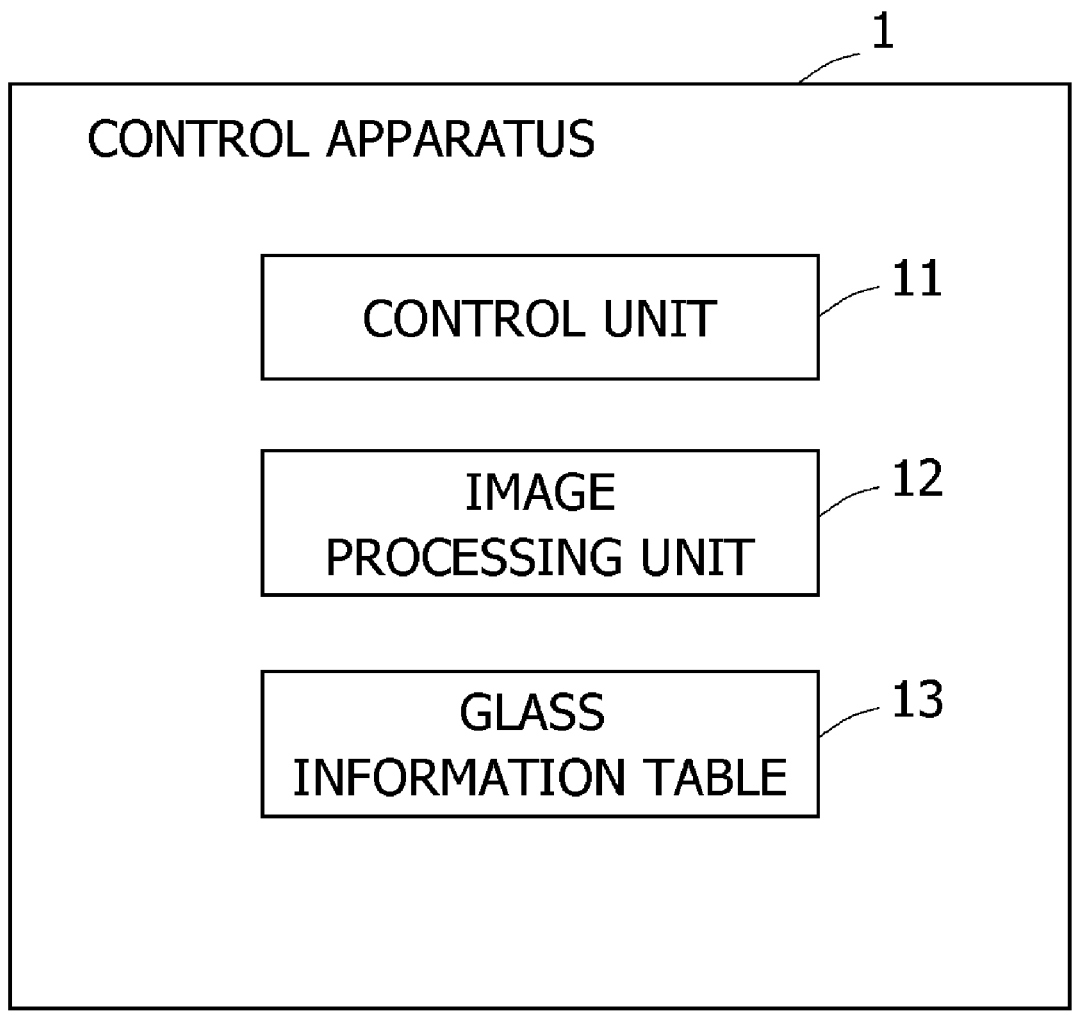
FIG. 3 is a diagram illustrating an example of a functional configuration of the control apparatus.

FIG. 3 is a diagram illustrating an example of a functional configuration of the control apparatus 1. The control apparatus 1 has a control unit 11, an image processing unit 12, and a glass information table 13 as functional components. These functional components are achieved, for example, by the CPU 101 of the control apparatus 1 executing a predetermined program stored in the external storage device 103.

The control unit 11 receives input of sensing values from the sensors 2. The sensing values of the sensors 2 are exemplarily information indicating entering information of natural light. When the information indicating the entering situation of natural light is input from the sensors 2, the control unit 11 specifies a dimming glass unit 110 which is a control target in accordance with the entering situation of natural light. Examples of the dimming glass unit 110 as the control target include a dimming glass unit 110 in a window that the natural light enters, and a dimming glass unit 110 that is in the light shielding state although natural light does not enter it. The light shielding state is a state of blocking off natural light or the similar state. More specifically, in the first embodiment, the light shielding state is a state where the dimming glass unit 110 is opaque by the rate of transmission being elevated.

For example, when light shielding conditions are satisfied, the control unit 11 specifies a dimming glass unit 110 that natural light enters as the control target and brings the dimming glass unit 110 as the control target into the light shielding state. The light shielding conditions include a condition which indicates that an occupant in the vehicle 100 feels glaringness and is for bringing a dimming glass unit into the light shielding state. For example, when light shielding release conditions are satisfied, the control unit 11 specifies a dimming glass unit 110 in the light shielding state as the control target and releases the light shielding state of the dimming glass unit 110 as the control target. The light shielding release conditions include a condition which indicates that an occupant in the vehicle 100 does not feel glaringness and is for releasing the light shielding state of a dimming glass unit 110. Such a light shielding condition is an example of the "first condition". Such a light shielding release condition is an example of the "second condition".

In the first embodiment, there are the set of illuminometers 120 and the camera 130 that can be used as things used as the sensors 2. It is supposed in the first embodiment that any one of the set of illuminometers 120 and the camera 130 is used. It is noted that not limited to this, both the set of illuminometers 120 and the camera 130 may be used.

For example, when the illuminometer 120 is used as the sensor 2, the sensing value of the sensor 2 is an illuminance sensed by the illuminometer 120. For example, when the illuminometer 120 is used as the sensor 2, the light shielding condition is that the illuminance is equal to or more than a first illuminance threshold. In this case, the control unit 11 specifies a dimming glass unit 110 corresponding to the illuminance sensor the illuminance of which is equal to or more than the first illuminance threshold as the control target. Moreover, for example, when the illuminometer 120 is used as the sensor 2, the light shielding release condition is that the illuminance is equal to or less than a second illuminance threshold. The second illuminance threshold is a value equal to or less than the first illuminance threshold. In this case, the control unit 11 specifies a dimming glass unit 110 the illuminance of which is equal to or less than the second illuminance threshold and which is in the light shielding state as the control target.

For example, when the camera 130 is used as the sensor 2, the sensing value of the sensor 2 is a captured image of the camera 130. For example, when the camera 130 is used as the sensor 2, the light shielding condition is that a region that has a luminance equal to or more than a first luminance threshold and has a predetermined area or more is detected from the captured image through image processing. In this case, the control unit 11 specifies a dimming glass unit 110 that natural light enters from the result of image analysis on the captured image as the control target. Moreover, for example, when the camera 130 is used as the sensor 2, the light shielding condition may be that an expression or an action of at least any of an occupant in the vehicle indicates feeling glaringness from the captured image through image processing. In this case, the control unit 11 specifies a dimming glass unit 110 positioned, for example, nearest to the relevant occupant from the result of image analysis on the captured image as the control target. Notably, when the camera 130 is used as the sensor 2, the light shielding conditions may include any one of the above two or both of them.

For example, when the camera 130 is used as the sensor 2, the light shielding release condition is that a region that has a luminance equal to or more than the first luminance threshold and has a predetermined area or more is not detected from the captured image through image processing. In this case, the control unit 11 specifies a dimming glass unit 110 that is in the light shielding state as the control target. Moreover, the light shielding release condition is that neither an expression nor an action of any occupant in the vehicle 100 indicates feeling glaringness from the captured image through image processing. When the light shielding release condition is any of the above two, the control unit 11 specifies a dimming glass unit 110 in the light shielding state as the control target. The light shielding release conditions may include any one of the above two or both of them.

When controlling the light shielding property of the dimming glass unit 110, the control unit 11 by way of example controls the rate of transmission of the dimming glass unit 110. For example, the rate of transmission of the dimming glass unit 110 can be elevated by applying a voltage to the dimming glass unit 110. For example, by setting the rate of transmission of the dimming glass unit 110 to be equal to or more than a first threshold for the rate of transmission, the dimming glass unit 110 is brought into the light shielding state. When the light shielding condition is satisfied, the control unit 11 applies a predetermined quantity of voltage to the dimming glass unit 110 as the control target such that the dimming glass unit 110 as the control target has a predetermined rate of transmission or more.

For example, the light shielding state of the dimming glass unit 110 is released by application of a voltage to the dimming glass unit 110 being stopped or by the rate of transmission of the dimming glass unit becoming equal to or less than a second threshold for the rate of transmission. The second threshold for the rate of transmission is a value equal to or less than the first threshold for the rate of transmission. When the light shielding release condition is satisfied, the control unit 11 releases the light shielding state of the dimming glass unit 110 as the control target.

The image processing unit 12 performs image analysis in accordance with instructions from the control unit 11. The image processing unit 12 is a functional component corresponding to the image processing unit 104. The image analysis results of the image processing unit 12 are output to the control unit 11. From the image analysis results of the image processing unit 12, a region having a luminance equal to or more than a predetermined value, an entering position of natural light, or/and an expression of an occupant in the vehicle 100 by way of example are acquired. It is noted that information acquired from the image analysis results is not limited to these.

FIG. 4 illustrates an example of the glass information table 13. The glass information table 13 holds information regarding the dimming glass units 110. The glass information table 13 is stored, for example, in a storage area of the external storage device 103.

The glass information table 13 includes fields of a glass ID, a position, a sensor ID, and a light shielding state. The field of the glass ID stores identification information of the dimming glass unit 110 provided in each window. The field of the position stores information indicating the position where the dimming glass unit 110 is provided. Examples of the information indicating the position where the dimming glass unit 110 is provided may include information, indicating the positions of the windows, indicating "front right", "rear right", "front left", "rear left", "back face", and the like. Otherwise, the information indicating the position where the dimming glass unit 110 is provided may be coordinates in a coordinate system in the vehicle 100.

The field of the sensor ID stores identification information of the illuminometer 120 in association with the dimming glass unit 110. The field of the light shielding state stores information indicating the light shielding state of the dimming glass unit 110. Examples of the information indicating the light shielding state of the dimming glass unit 110 include "ON" indicating being in the light shielding state and "OFF" indicating not being in the light shielding state. These may be indicated, for example, by a flag. Notably, the information indicating the light shielding state of the dimming glass unit 110 is not limited to these but may be the rate of transmission currently set.

Notably, the functional configuration of the control apparatus 1 illustrated in FIG. 3 and the configuration of the glass information table 13 are merely exemplary, not limiting.

Flow of Processing

FIG. 5 is an example of a flowchart of processing for controlling the light shielding properties of the dimming glass units 110 in the control apparatus 1. The processing illustrated in FIG. 5 is repeatedly performed at predetermined period during the operation of the control apparatus 1. Otherwise, as to the processing illustrated in FIG. 5, dimming control of the dimming glass unit 110 is made effective for the control apparatus 1 by user operation, and it is repeatedly performed during the operation of the control apparatus 1. While the subject which performs the processing illustrated in FIG. 5 is the CPU 101, the description will be made with the functional components being as the subject for convenience.

In OP101, the control unit 11 determines whether or not it receives the sensing value of the sensor 2. When the sensing value of the sensor 2 is received (OP101: YES), the process proceeds to OP102. When the sensing value of the sensor 2 is not received (OP101: NO), the processing illustrated in FIG. 5 ends.

In OP102, the control unit 11 determines whether or not the light shielding condition is satisfied based on the sensing value of the sensor 2. When the light shielding condition is satisfied (OP102: YES), the process proceeds to OP103. When the light shielding condition is not satisfied (OP102: NO), the process proceeds to OP106. When the illuminometer 120 is used as the sensor 2, the light shielding condition is that the illuminance is equal to or more than the first illuminance threshold. When the camera 130 is used as the sensor 2, the light shielding conditions include that a region that has a luminance equal to or more than the first luminance threshold and has a predetermined area or more is detected from the captured image or/and that at least any of an expression or an action of an occupant in the vehicle indicates feeling glaringness from the captured image, through image processing.

In OP103, the control unit 11 specifies the dimming glass unit 110 that is the control target. When the illuminometer 120 is used as the sensor 2, referring to the glass information table 13, the control unit 11 specifies a dimming glass unit 110 in association with the illuminometer 120 the illuminance of which is equal to or more than the first illuminance threshold as the control target. When the camera 130 is used as the sensor 2, from the result of image analysis on the captured image, the control unit 11 specifies a dimming glass unit 110 that natural light enters or/and a dimming glass unit 110 positioned nearest to an occupant who exhibits an expression or an action of feeling glaringness, as the control target.

In OP104, referring to the glass information table 13, the control unit 11 determines whether or not the dimming glass unit 110 as the control target is in the light shielding state. When the dimming glass unit 110 as the control target is in a light shielding state (OP104: YES), control to the dimming glass unit 110 as the control target is not performed and the processing illustrated in FIG. 5 ends. When the dimming glass unit 110 as the control target is not in the light shielding state (OP104: NO), the process proceeds to OP105.

In OP105, the control unit 11 applies a voltage, for example, having a predetermined value to the dimming glass unit 110 as the control target such that the dimming glass unit 110 as the control target is in the light shielding state. After that, the processing illustrated in FIG. 5 ends.

In OP106, the control unit 11 determines whether or not the light shielding release condition is satisfied based on the sensing value of the sensor 2. When the light shielding release condition is satisfied (OP106: YES), the process proceeds to OP107. When the light shielding release condition is not satisfied (OP106: NO), the processing illustrated in FIG. 5 ends.

When the illuminometer 120 is used as the sensor 2, the light shielding release condition is that the illuminance is equal to or less than the second illuminance threshold. When the camera 130 is used as the sensor 2, the light shielding release conditions include that a region that has a luminance equal to or more than the first luminance threshold and has a predetermined area or more is not detected or/and that neither an expression nor an action of any occupant in the vehicle 100 indicates feeling glaringness from the captured image through image processing.

In OP107, in any of the cases of the light shielding release conditions, the control unit 11 specifies a dimming glass unit 110 in the light shielding state as the control target.

In OP108, referring to the glass information table 13, the control unit 11 determines whether or not the dimming glass unit 110 as the control target is in the light shielding state. When the dimming glass unit 110 as the control target is in the light shelding state (OP108: YES), the process proceeds to OP109. When the dimming glass unit 110 as the control target is not in the light shielding state (OP108: NO), control to the dimming glass unit 110 as the control target is not performed and the processing illustrated in FIG. 5 ends.

In OP109, the control unit 11 releases the light shielding state of the dimming glass unit 110 as the control target. For example, the control unit 11 stops the application of the voltage to the dimming glass unit 110 as the control target, or controls the value of the applied voltage such that the rate of transmission of the dimming glass unit 110 as the control target is equal to or less than the second threshold for the rate of transmission. After that, the processing illustrated in FIG. 5 ends.

Notably, the processing for controlling the light shielding properties of the dimming glass units 110 in the control apparatus 1 is not limited to the processing illustrated in FIG. 5. Since when the dimming glass unit 110 frequently changes the light shielding state and the state where the light shielding state is released, this rather causes discomfort on the occupant, the dimming glass unit 110 as the control target may be controlled when the light shielding condition or the light shielding release condition continues for a predetermined period.

Operation and Effects of First Embodiment

In first embodiment, the dimming glass unit 110 used for the window is brought into the light shielding state and its light shielding state is released in accordance with the entering situation of natural light into the vehicle 100. Thereby, entering of natural light can be restrained from making it hard to see matters displayed inside the vehicle 100 or on the dimming glass unit 110 and/or the similar matters.

As the information indicating the entering situation into the vehicle 100, the illuminances of the illuminometers 120 provided in association with the dimming glass units are used, and thereby, the dimming glass unit 110 as the control target can be more accurately specified. When as the information indicating the entering information into the vehicle 100, the captured image of the interior of the vehicle 100 by the camera 130 is used, the function can be easily added afterward which controls the light shielding property of the dimming glass unit 110 in accordance with the entering situation.

Other Embodiments

The embodiment described above is an example, and the present disclosure may be changed and carried out as appropriate without departing from the gist of the present disclosure.

In the first embodiment, it is supposed that the illuminometer 120 is installed on the surface of each dimming glass unit 110, not being limited to this. For example, the illuminometer 120 may be installed near each seat to be in association with the dimming glass unit 110 on the basis of the entering angle of natural light. Otherwise, the illuminometers 120 may be installed on one or more desks installed in the vehicle 100. In this case, the illuminometer 120 may be in association with the dimming glass unit 110 positioned in the entering direction of natural light that projects a shade on the desk obtained in advance. When the plurality of illuminometers 120 are installed at predetermined positions other than the surfaces of the dimming glass units 110 in the vehicle 100, the dimming glass unit 110 as the control target may be specified based on the positions and illuminances of the illuminometers 120.

In the first embodiment, the dimming glass unit 110 is controlled into the light shielding state or the state where the light shielding state is released in accordance with the entering situation of natural light. Not limited to this, a plurality of degrees of light shielding may be set, so that in accordance with the entering situation of natural light, the degree of light shielding of the dimming glass unit is controlled stepwise.

Moreover, in the first embodiment, the light shielding property of the dimming glass unit 110 is controlled by controlling the rate of transmission, not being limited to this. For example, the light shielding property of the dimming glass unit 110 may be controlled by controlling the color tone.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. A vehicle comprising:
a plurality of dimming glass units used for a plurality of windows;
a sensor configured to acquire an entering situation of natural light at a predetermined position; and
a controller configured to:
specify a first dimming glass unit that is a control target out of the plurality of dimming glass units in accordance with the entering situation of the natural light; and
control quantity of transmitted light of the first dimming glass unit; wherein
the controller is configured to control the first dimming glass unit so as to be in a light shielding state in a case where the entering situation of the natural light satisfies a first condition indicating a degree of glaringness in the vehicle, wherein
the sensor is an image capturing apparatus that captures an image of an interior of the vehicle including the plurality of dimming glass units, and
the controller is configured to:
analyze a captured image of the image capturing apparatus;
as the first condition, determine whether a region of a luminance equal to or higher than a predetermined value, the region including a predetermined area or more, is detected from the captured image; and
specify a dimming glass unit that natural light enters out of the plurality of dimming glass units included in the captured image as the first dimming glass unit in response to a result of an analysis of the captured image in a case where the region satisfying the first condition is detected from the captured image.

2. The vehicle according to claim 1, wherein the controller is configured to perform control to release the light shielding state of the first dimming glass unit when the entering situation of the natural light satisfies a second condition indicating a degree of glaringness in the vehicle.

3. The vehicle according to claim 1, wherein the controller is configured to control the quantity of transmitted light of the first dimming glass unit by controlling a rate of transmission of the first dimming glass unit.

4. The vehicle according to claim 1, wherein
the sensor includes a plurality of illuminometers provided in association with the plurality of respective dimming glass units, and
when it is satisfied, as the first condition, that a sensing value of at least one of the plurality of illuminometers is larger than a first threshold, the controller specifies a dimming glass unit corresponding to the at least one illuminometer as the first dimming glass unit.

5. The vehicle according to claim 2, wherein
the sensor includes a plurality of illuminometers provided in association with the plurality of respective dimming glass units, and
when it is satisfied, as the second condition, that a sensing value of at least one of the plurality of illuminometers is smaller than a second threshold equal to or less than a first threshold, the controller is configured to specify a dimming glass unit corresponding to the at least one illuminometer as the first dimming glass unit.

6. The vehicle according to claim 1, wherein when it is further satisfied, as the first condition, that at least any of an expression or an action of the occupant feeling glaringness in the vehicle is detected from the captured image of the image capturing apparatus, the controller is configured to specify a dimming glass unit that natural light enters out of the plurality of dimming glass units included in the captured image as the first dimming glass unit.

7. The vehicle according to claim 2, wherein
the sensor is an image capturing apparatus that captures an image of an interior of the vehicle, and
when it is satisfied, as the second condition, that a region having a luminance equal to or more than a predetermined value is not detected from the captured image of the image capturing apparatus, the controller is configured to specify at least part of the plurality of dimming glass units out of the plurality of dimming glass units included in the captured image as the first dimming glass unit.

8. The vehicle according to claim 7, wherein when it is satisfied, as the second condition, that neither an expression nor an action of the occupant feeling glaringness in the vehicle is detected from the captured image of the image capturing apparatus, the controller is configured to specify at least part of the plurality of dimming glass units out of the plurality of dimming glass units included in the captured image as the first dimming glass unit.

9. An information processing apparatus mounted on a vehicle, comprising a controller configured to:
specify a first dimming glass unit that is a control target out of a plurality of dimming glass units used for a plurality of windows of the vehicle in accordance with an entering situation of natural light at a predetermined position in the vehicle, the entering situation acquired by a sensor; and
control quantity of transmitted light of the first dimming glass unit; wherein
the controller is configured to control the first dimming glass unit so as to be in a light shielding state in a case where the entering situation of the natural light satisfies a first condition indicating a degree of glaringness in the vehicle, wherein
the sensor is an image capturing apparatus that captures an image of an interior of the vehicle including the plurality of dimming glass units, and
the controller is configured to:
analyze a captured image of the image capturing apparatus;
as the first condition, determine whether a region of a luminance equal to or higher than a predetermined value, the region including a predetermined area or more, is detected from the captured image; and
specify a dimming glass unit that natural light enters out of the plurality of dimming glass units included in the captured image as the first dimming glass unit in response to a result of an analysis of the captured image in a case where the region satisfying the first condition is detected from the captured image.

10. The information processing apparatus according to claim 9, wherein the controller is configured to perform control to release the light shielding state of the first dimming glass unit when the entering situation of the natural light satisfies a second condition indicating a degree of glaringness in the vehicle.

11. The information processing apparatus according to claim 9, wherein
the sensor includes a plurality of illuminometers provided in association with the plurality of respective dimming glass units, and
when it is satisfied, as the first condition, that a sensing value of at least one of the plurality of illuminometers is larger than a first threshold, the controller is configured to specify a dimming glass unit corresponding to the at least one illuminometer as the first dimming glass unit.

12. The information processing apparatus according to claim 10, wherein
the sensor includes a plurality of illuminometers provided in association with the plurality of respective dimming glass units, and
when it is satisfied, as the second condition, that a sensing value of at least one of the plurality of illuminometers is smaller than a second threshold equal to or less than a first threshold, the controller is configured to specify a dimming glass unit corresponding to the at least one illuminometer as the first dimming glass unit.

13. The information processing apparatus according to claim 1, wherein when it is further satisfied, as the first condition, that at least any of an expression or an action of the occupant feeling glaringness in the vehicle is detected from the captured image of the image capturing apparatus, the controller is configured to specify a dimming glass unit that natural light enters out of the plurality of dimming glass units included in the captured image as the first dimming glass unit.

14. The information processing apparatus according to claim 10, wherein
the sensor is an image capturing apparatus that captures an image of an interior of the vehicle, and
when it is satisfied, as the second condition, that a region having a luminance equal to or more than a predetermined value is not detected from the captured image of the image capturing apparatus, the controller is configured to specify at least part of the plurality of dimming glass units out of the plurality of dimming glass units included in the captured image as the first dimming glass unit.

15. The information processing apparatus according to claim 14, wherein when it is satisfied, as the second condition, that neither an expression nor an action of the occupant feeling glaringness in the vehicle is detected from the captured image of the image capturing apparatus, the controller is configured to specify at least part of the plurality of dimming glass units out of the plurality of dimming glass units included in the captured image as the first dimming glass unit.

16. A method comprising: by a computer mounted on a vehicle,
specifying a first dimming glass unit that is a control target out of a plurality of dimming glass units used for a plurality of windows of the vehicle in accordance with an entering situation of natural light at a predetermined position in the vehicle, the entering situation acquired by a sensor; and controlling quantity of transmitted light of the first dimming glass unit; wherein controlling the first dimming glass unit so as to be in a light shielding state in a case where the entering situation of the natural light satisfies a first condition indicating a degree of glaringness in the vehicle, wherein the sensor is an image capturing apparatus that captures an image of an interior of the vehicle including the plurality of dimming glass units, and the computer is controlled so as to:

analyze a captured image of the image capturing apparatus;

as the first condition, determine whether a region of a luminance equal to or higher than a predetermined value, the region including a predetermined area or more, is detected from the captured image; and specify a dimming glass unit that natural light enters out of the plurality of dimming glass units included in the captured image as the first dimming glass unit in response to a result of an analysis of the captured image in a case where the region satisfying the first condition is detected from the captured image.

* * * * *